United States Patent
Onozawa

(10) Patent No.: US 7,324,151 B2
(45) Date of Patent: Jan. 29, 2008

(54) PHOTOGRAPHING APPARATUS, AND METHOD AND PROGRAM FOR DISPLAYING FOCUSING CONDITION

(75) Inventor: Masaru Onozawa, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 770 days.

(21) Appl. No.: 10/369,474

(22) Filed: Feb. 20, 2003

(65) Prior Publication Data

US 2003/0174233 A1    Sep. 18, 2003

(30) Foreign Application Priority Data

Mar. 12, 2002    (JP)    ............................... 2002-066603

(51) Int. Cl.
  H04N 5/232    (2006.01)
  G03B 13/00    (2006.01)
  H04N 5/222    (2006.01)
  G03B 17/00    (2006.01)

(52) U.S. Cl. ................. 348/346; 348/345; 348/333.02; 396/72

(58) Field of Classification Search ................. 348/345, 348/346, 333.01, 333.02; 396/72, 79, 80, 396/84, 88

See application file for complete search history.

(56) References Cited

U.S. PATENT DOCUMENTS

| 4,463,384 | A | * | 7/1984 | Fujikawa et al. | ........... 348/346 |
| 4,794,459 | A | * | 12/1988 | Moberg et al. | ............. 348/346 |
| 5,907,353 | A | * | 5/1999 | Okauchi | ................... 348/218.1 |
| 6,556,240 | B2 | * | 4/2003 | Oka et al. | .............. 348/211.99 |
| 6,937,284 | B1 | * | 8/2005 | Singh et al. | ................. 348/346 |
| 2001/0014217 | A1 | * | 8/2001 | Hori | ........................... 396/266 |
| 2005/0264681 | A1 | * | 12/2005 | Ohta | ........................ 348/345 |

FOREIGN PATENT DOCUMENTS

| JP | 10-042184 A | 2/1998 |
| JP | 2001-042207 A | 2/2001 |

OTHER PUBLICATIONS

Machine Translation of JP 2001-042207, Olympus Optical Co. LTD, Feb. 16, 2001.*

* cited by examiner

Primary Examiner—Lin Ye
Assistant Examiner—Kelly Jerabek
(74) Attorney, Agent, or Firm—Frishauf, Holtz, Goodman & Chick, P.C.

(57) ABSTRACT

Luminance components of image profile portions are extracted from luminance components (Y components) included in image data corresponding to an image within a focus frame. A profile component evaluation value is obtained by totalizing the absolute values of two-dimensionally-differentiated values of the extracted components. A distribution graph of a focus lens position and the profile component evaluation value is generated. A finder image is displayed by combining a photo-object image and the distribution graph. At this time, a bar corresponding to a current focus lens position is displayed in a different color from that of other bars in the distribution graph.

3 Claims, 7 Drawing Sheets

| FOCUS LENS POSITION | FOCUSING EVALUATION VALUE |
|---|---|
| NEAR | |
| | |
| | |
| | |
| ⋮ | ⋮ |
| FAR | |

(S9)
↓
STORE FOCUSING EVALUATION VALUE IN ASSOCIATION WITH OBTAINED LENS POSITION (UPDATE) — S10-1
↓
GENERATE EVALUATION VALUE DISTRIBUTION GRAPH BASED ON RECORD TABLE — S10-2
↓
CHANGE COLOR OF BAR CORRESPONDING TO OBTAINED LENS POSITION — S10-3
↓
(S11)

FIG.8

| FOCUS LENGTH | FOCUSING EVALUATION VALUE |
|---|---|
| 0.5m | |
| | |
| | |
| | |
| ⋮ | ⋮ |
| ∞ | |

70, 71, 72

PHOTOGRAPHING APPARATUS, AND METHOD AND PROGRAM FOR DISPLAYING FOCUSING CONDITION

BACKGROUND OF THE INVENTION

1. Field of the Invention

The present invention relates to a photographing apparatus such as a digital camera, etc., and particularly relates to a focusing support technique for manual focusing.

2. Description of the Related Art

When trying to bring an photo-object into focus using a manual focusing function of a photographing apparatus such as a digital camera, the user of the photographing apparatus does so by checking the blurredness of the photo-object (the clearness of the image) displayed on a liquid crystal monitor or the like.

For such focusing purposes, there have been provided a photographing apparatus which displays a bar 101 for indicating the position of the focus lens on a liquid crystal monitor as shown in FIG. 10, and a photographing apparatus which displays a bar 111 for indicating a focus length corresponding to the position of the focus lens as shown in FIG. 11, in order to give a standard to be referred to when focusing.

SUMMARY OF THE INVENTION

A photographing apparatus is provided which has a manual focusing function in which a photo-object is brought into focus through a manual operation performed by a user. According to an aspect of the present invention, the photographing apparatus includes: (i) a focus button for instructing movement of a focus lens; (ii) a focusing evaluation value obtaining unit which extracts contrast values of profiles of an image portion within a focus area of a photo-object image which is output from a photographing unit and obtains focusing evaluation values based on the extracted contrast values; (iii) a lens position obtaining unit which obtains a focus lens position of the focus lens that is moved in accordance with operation of the focus button; (iv) a distribution graph generation unit which generates, based on focusing evaluation values obtained successively by the focusing evaluation value obtaining unit and focus lens positions obtained successively by the lens position obtaining unit, a distribution graph of the focusing evaluation values in one to one correspondence with the focus lens positions, the distribution graph representing the focusing evaluation values by a plurality of bars; (v) an image display unit which acquires the photo-object image output from the photographing unit, and displays the acquired photo-object image as a finder image; and (vi) an image superimposition unit which superimposes the distribution graph generated by the distribution graph generation unit on the finder image displayed by the image display unit. Display of the plurality of bars of the generated distribution graph, representing the focusing evaluation values, enables a visual determination of the focus lengths corresponding to the plurality of focus lens positions and distinguishing of a focusing evaluation value corresponding to a current focus lens position from the focusing evaluation values corresponding to other focus lens positions.

BRIEF DESCRIPTION OF THE DRAWINGS

These objects and other objects and advantages of the present invention will become more apparent upon reading of the following detailed description and the accompanying drawings in which:

FIG. 7 is a flowchart showing an example of an operation for generating an evaluation value distribution graph;

FIG. 8 is a diagram showing a modified example of a record table to be used when an evaluation value distribution graph is generated;

DETAILED DESCRIPTION OF THE PREFERRED EMBODIMENTS

1. Structure of Hardware

Figure 1:
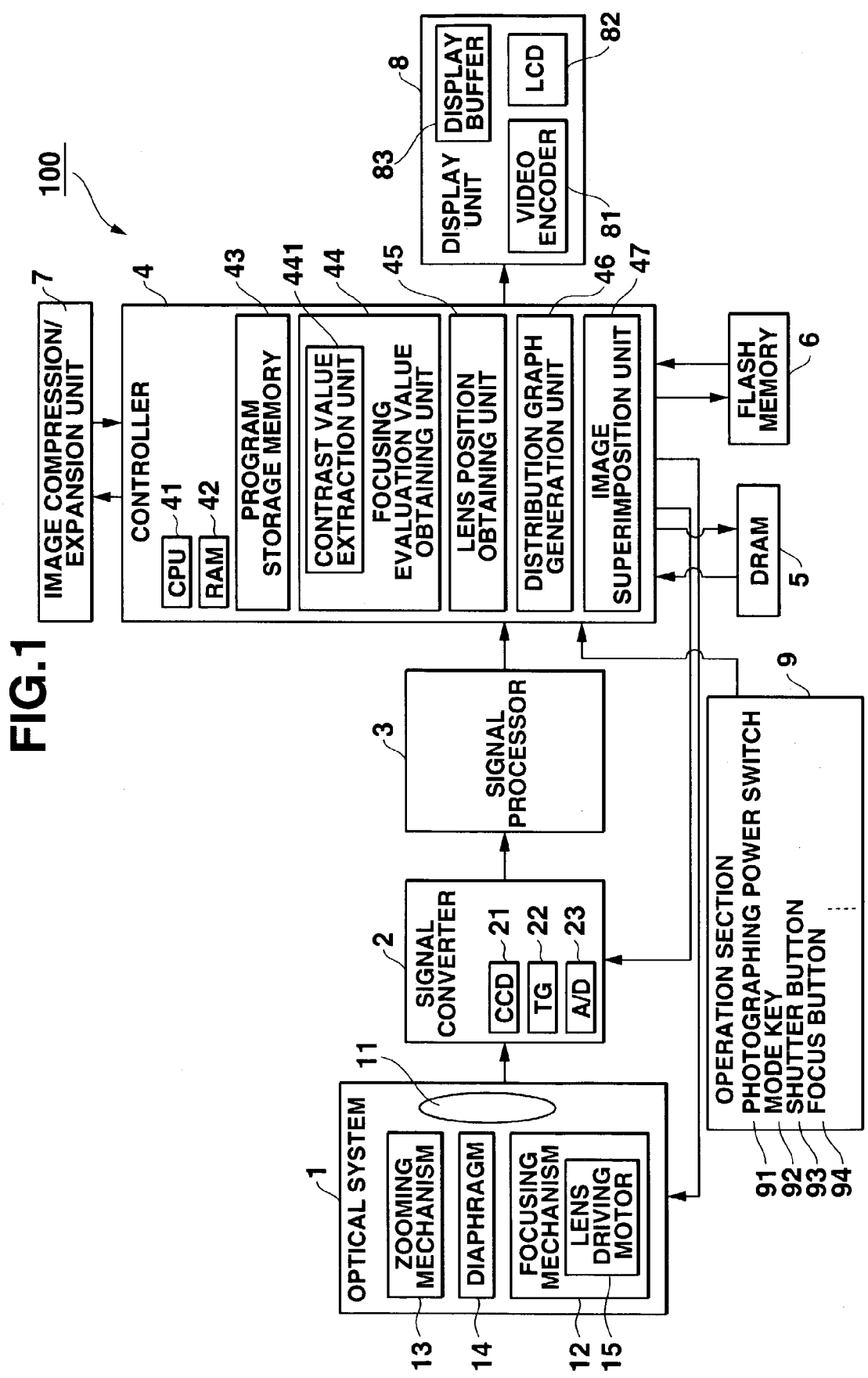
FIG. 1 is a block diagram showing a circuit structure of a photographing apparatus according to an embodiment of the present invention.

FIG. 1 is a block diagram showing a circuit structure of a photographing apparatus according to one embodiment of the present invention. In FIG. 1, a circuit structure of a digital camera is shown as an example of a photographing apparatus.

In FIG. 1, the digital camera 100 comprises an optical system 1, a signal converter 2, a signal processor 3, a controller 4, a DRAM 5, a flash memory 6, an image compression/expansion unit 7, a display unit 8, and an operation section 9.

The optical system 1 is constituted by photographing lenses including a focus lens 11, and a driving unit including a focusing mechanism 12, a zooming mechanism 13, a diaphragm 14, etc. The optical system 1 captures an optical image of a photo-object, and forms the image on a CCD 21 of the signal converter 2. The focus lens 11 is moved by the focusing mechanism 12 back and forth. The focusing mechanism 12 includes a lens driving motor 15, and moves the focus lens 11 in accordance with a control signal from the controller 4.

The signal converter 2 is constituted by a photographing element such as the CCD 21, a timing generator (TG) 22, and an A/D converter 23. The signal converter 2 converts the optical image of the photo-object captured by the optical system 1 into an image signal by the CCD 21 at a predetermined timing, and further into digital data (RGB data in Bayer arrangement), and sends the digital data to the signal processor 3.

The signal processor 3 converts the digital data (image data) from the signal converter 2 into a luminance-chrominance multiplexed signal component (YUV data), and sends it to the DRAM 5.

The controller 4 has a microcomputer structure including a CPU (or MPU) 41, a RAM 42, a program storage memory 43, a focusing evaluation value obtaining unit 44, a lens position obtaining unit 45, a distribution graph generation unit 46, and an image superimposition unit 47. The controller 4 controls the entire digital camera 100, and operations in each mode. The CPU 41 is connected to each element of the digital camera 100 via a bus line (not shown). The CPU 41 controls the entire digital camera 100 in accordance with a control program stored in the program storage memory 43. Also, the CPU 41 reads out a focusing condition display program of the present invention and other programs for selected operational modes from the program storage memory 43 (or from the flash memory 6), and controls the operation of each element in accordance with these programs. The program storage memory 43 stores constants such as initial values, menu data, etc., in addition to the above described programs. The focusing evaluation value obtaining unit 44 includes a contrast value extraction unit 441 for extracting a contrast value of a photo-object image, thereby to extract a contrast value and obtain a focusing evaluation value.

The lens position obtaining unit 45 obtains a current position of the focus lens 11. The distribution graph generation unit 46 generates a distribution graph based on the obtained focusing evaluation value and the obtained position of the focus lens 11. The image superimposition unit 47 superimposes the distribution graph on the photo-object image displayed on the display unit 8.

The DRAM 5 temporarily stores the image data (YUV data) sent from the signal converter 2. The flash memory 6 is used as means for storing compressed image, etc.

The image compression/expansion unit 7 includes, for example, an encoder and decoder of a JPEG standard. The image compression/expansion unit 7 compresses image data to be stored in a storage memory such as the flash memory 6, and expands compressed image data read out from such a storage memory.

The display unit 8 includes a vide encoder 81, a LCD (liquid crystal display) 82, and a display buffer 83. The display unit 8 converts the image data sent from the DRAM 5 via the controller 4 into a video signal, and displays the video signal on the LCD 82. An area within the DRAM 5 may be used as the display buffer 83.

The operation section 9 comprises a photographing power switch 91, a mode key (operational mode selection key) 92, a shutter button 93, and a focus button 94. When these keys are operated, a status signal is sent to the CPU 41 of the controller 4. A user can adjust the focus manually by operating the focus button 94 thereby to move the focus lens 11.

2. Example of Focusing Condition Display

Figure 2:
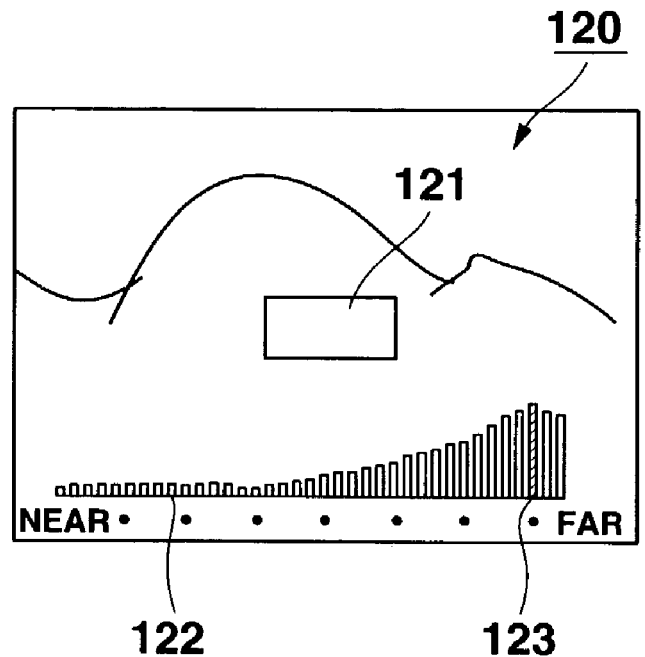
FIG. 2 is a diagram showing an example of focusing condition display which appears when manual focusing is performed.

FIG. 2 is a diagram showing an example of focusing condition display which may appear when manual focusing is performed according to the present invention. This focusing condition display is shown on the screen of the LCD 82 as a distribution graph of a photo-object profile (high frequency) component evaluation value obtained at each focus lens position and the current position of the focus lens 11.

In FIG. 2, reference numeral 120 denotes the image in the finder (through image) on which a distribution graph 122 is superimposed. Reference numeral 121 denotes a focus frame defining a focus area. Reference numeral 122 denotes a distribution graph which indicates by using a bar, a photo-object profile component evaluation value at each focus lens position and the position of the focus lens 11. Reference numeral 123 denotes a bar corresponding to the current position of the focus lens 11. The bar 123 corresponding to the current position of the focus lens 11 is displayed differently from other bars so that it can be easily recognized visually. Differential display can be achieved by, for example, using different colors for the bar 123 and for the other bars respectively, by emphasizing the bar 123, or by displaying the bar 123 reversely.

Figure 3:
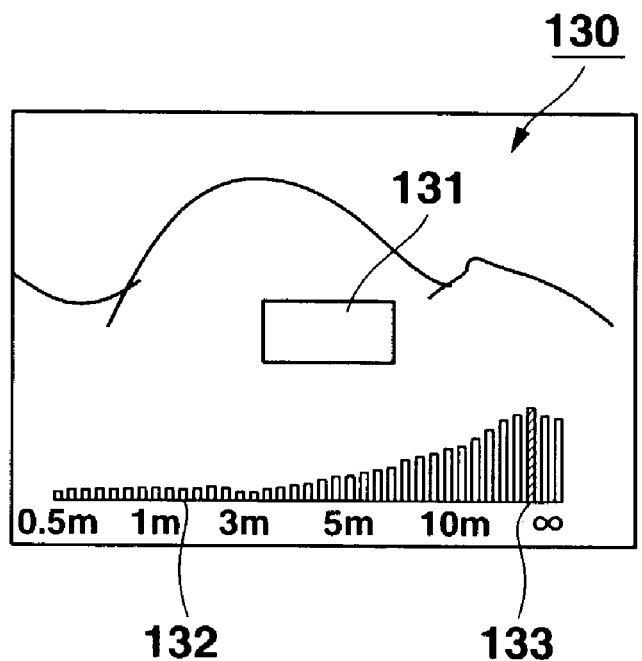
FIG. 3 is a diagram showing another example of focusing condition display which appears when manual focusing is performed.

FIG. 3 is a diagram showing another example of focusing condition display which may appear when manual focusing is performed according to the present invention. This focusing condition display is shown on the screen of the LCD 82 as a distribution graph of a photo-object profile component evaluation value obtained at each focus lens position and a focus length of the position of the focus lens 11.

In FIG. 3, reference numeral 130 denotes the image in the finder on which a distribution graph 132 is superimposed. Reference numeral 131 denotes a focus frame defining a focus area. Reference numeral 132 denotes a bar which corresponds to a photo-object profile component evaluation value at each focus lens position. A bar 133 corresponding to a current focus length is displayed differently from other bars, so that it can be easily recognized visually.

3. Operation for Displaying Focusing Condition

Figure 4:
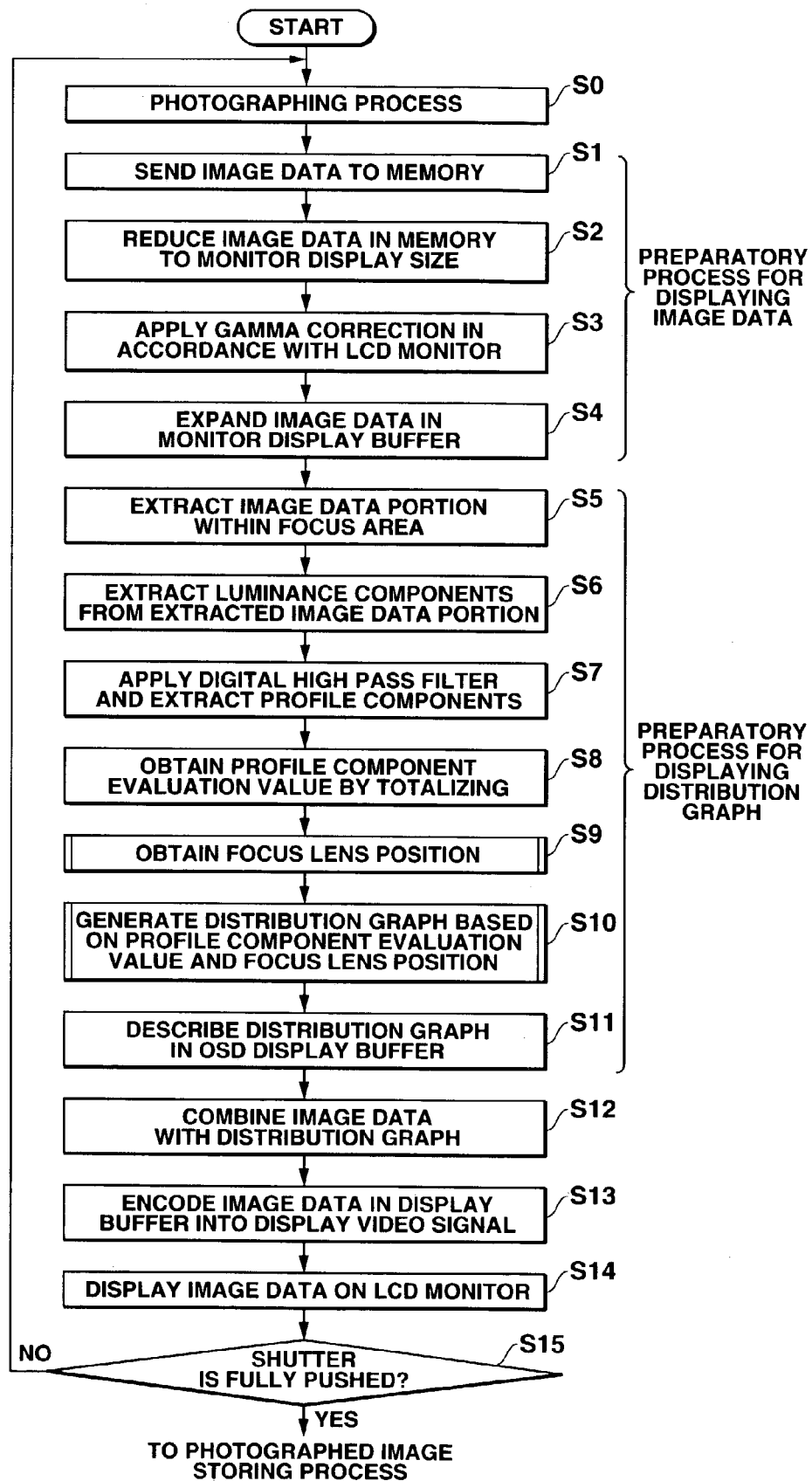
FIG. 4 is a flowchart showing an example of an operation for displaying focusing condition when photographing is performed.

FIG. 4 is a flowchart showing an example of a focusing condition display operation which is performed when taking a photograph. The focusing condition display operation will now be explained.

In FIG. 4, step S0 is a photographing process, steps S1 to S4 are a preparatory process for displaying an image in a monitor size, steps S5 to S11 are a preparatory step for displaying an evaluation value distribution graph (which is denoted by reference numeral 122 in FIG. 2, and by reference numeral 132 in FIG. 3), and step S12 is an image combining process. The operation of the CPU 41 in the flowchart of FIG. 4 is in accordance with a focusing condition display program of the present invention.

In FIG. 4, when a user switches on the photographing power switch (main power source) 91 and selects a photographing mode, an optical image of a photo-object which is formed on the CCD 21 through the photographing lenses of the optical system 1 is converted into an electric signal (image data) by the CCD 21 at a predetermined timing, and further converted into a digital data, and output to the signal processor 3 (step S0).

The signal processor 3 converts the image data (digital data) from the signal converter 2 into YUV data, and sends it to the DRAM 5 (step S1).

The CPU 41 reads out the image data (YUV data) sent from the signal processor 3 and stored in an image data storage area of the DRAM 5, reduces the number of pixels included in the image data to a number suitable for the display size of the LCD 82 (step S2). The CPU 41 further applies gamma correction to the image data (step S3), and expands the image data in a LCD display buffer (step S4).

(When the profile of the photographed image becomes the clearest, it can be said that the photo-object is in focus. Accordingly, a focus lens position, at which the total value of the absolute values of two-dimensionally-differentiated values of luminance components (contrast components)

included in the image within the focus area (the focus frame 121 or 131 shown in FIG. 2 or 3) becomes the largest, is the in-focus position. Therefore, in steps S5 to S8, an operation for obtaining profile evaluation value data based on extraction of luminance components, will be performed).

The CPU 41 extracts an image data portion of the image data stored in the image data storage area of the DRAM 5 (i.e., the image data used in step S2), which portion corresponds to the image within the focus area (step S5), and extracts only luminance components (Y components) among the components of the extracted data portion (step S6).

The CPU 41 subjects the extracted luminance components of the focus area to digital high pass filter in order to further extract luminance components of the profile portions (step S7), and obtains a profile component evaluation value by totalizing the absolute values of two-dimensionally-differentiated values of the extracted luminance components, and retains the obtained value (step S8).

The CPU 41 obtains the position of the focus lens 11 at the time of photographing in step S0 (step S9). Then, the CPU 41 generates distribution graph data representing a distribution graph wherein position evaluation information corresponding to the obtained focus lens position is associated with the profile component evaluation value calculated in step S8 (step S10). The position evaluation information may be the focus lens position itself, or may be a focus length corresponding to the focus lens position (see FIG. 7 and FIG. 9).

The CPU 41 describes the distribution graph data generated in step S10 in an OSD (On Screen Display) display buffer (bit map expansion) (step S11).

Next, the CPU 41 combines the image expanded in the display buffer in step S4 with the distribution graph described in the OSD display buffer in step S11 (step S12), and sends the combined image to the video encoder 81.

The video encoder 81 encodes the received combined image into a display video signal (step S13), and displays the video represented by the display video signal on the LCD 82 (step S14).

The CPU 41 checks a status signal from the operation section 9, returns the flow to step S0 and repeats steps S0 to S14 until the shutter button 93 is fully pushed (step S15).

In the flowchart shown in FIG. 4, the preparatory process for displaying the image in the monitor display size (steps S1 to S4) is performed first, and then the preparatory process for displaying the distribution graph of the evaluation values (steps S5 to S11) is performed. However, the preparatory process for displaying the image in the monitor display size may be performed after the preparatory process for displaying the distribution graph of the evaluation values. The CPU 41 performs an operation shown in FIG. 5 in parallel with the operation shown in FIG. 4.

Figures 5, 6:
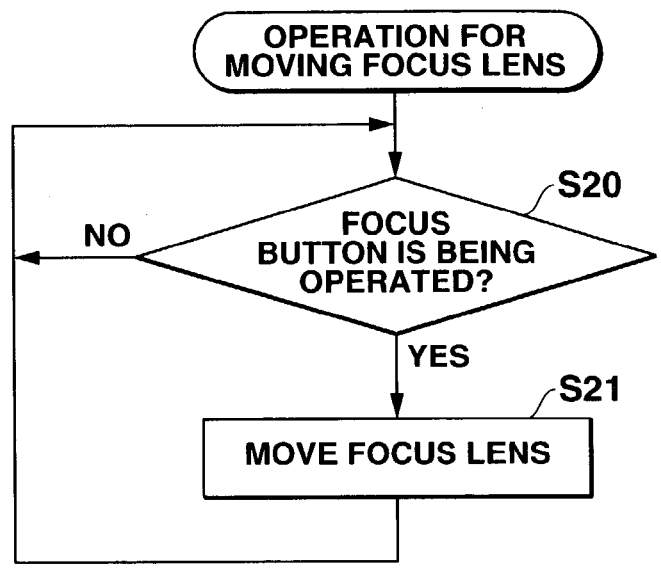
FIG. 5 is a flowchart showing an operation for moving a focus lens.
FIG. 6 is a diagram showing an example of a record table to be used when an evaluation value distribution graph is generated.

FIG. 5 is a flowchart showing an example of an operation for moving the focus lens 11 in case of electromotive manual focusing.

In FIG. 5, when the user operates the focus button 94, a status signal representing that the focus button is operated is sent from the operation section 9 to the CPU 41. The CPU 41 checks the status signal from the operation section 9. In a case where the focus button 94 is being operated, the flow goes to step S21. In a case where the focus button 94 is not being operated, the digital camera 100 is in a standby state waiting for the focus button 94 to be operated (step S20).

When the focus button 94 is operated, the CPU 41 sends a control signal to the focusing mechanism 12 in order to move the focus lens 11 in a direction in which the focus lens 11 is instructed to move. At the same time, the CPU 41 stores lens position information in the RAM 42 in order to perform step S9 in FIG. 4 for obtaining the position of the focus lens 11 (step S21).

When the user operates the focus button 94 and moves the focus lens 11 in accordance with the operation shown in the flowchart of FIG. 5, the position on the CCD 21 where the optical image of the photo-object is formed changes, and two-dimensionally-differentiated values of Y components within the focus area also change. Due to this, the clearness degree (blurredness degree) of the image in the finder displayed on the LCD 82 and the level (length) of the bar in the distribution graph superimposed on the finder image change, too. Due to this mechanism, when the focus button 94 is operated, a distribution graph indicating the profile component of the photo-object and the focus lens position (or a focus length corresponding to the focus lens position) is displayed on the finder image as visual information. Therefore, the user of the digital camera 100 can recognize and confirm the past and current focusing conditions on the LCD 8 by an objective evaluation method, unlike a case where using the photographing apparatuses of the prior art.

In the flowchart shown in FIG. 5, when the user operates the focus button 94 in step S20, a status signal representing that the focus button 94 is operated, and a moving direction instruction signal representing the direction in which the focus lens 11 should be moved ("NEAR" direction or "FAR" direction) are sent from the operation section 9 to the CPU 41. In step S21, the CPU 41 sends a control signal including an instruction on the moving direction to the focusing mechanism 12, and controls the focusing mechanism 12 to activate the lens driving motor 15 in order to move the focus lens 11 in the instructed direction. At the same time, the CPU 41 stores the position information of the focus lens 11 after being moved in the RAM 42. By performing this series of processes, it is possible to perform step S9 in FIG. 4 for obtaining the position of the focus lens 11, also in case of manual focusing.

4. Generation of Distribution Graph of Evaluation Values

FIG. 6 is a diagram showing an example of a record table which is used when a distribution graph of evaluation values is generated. FIG. 7 is a flowchart (a detailed flow of step S10 shown in FIG. 4) showing an example of an operation of generating an evaluation value distribution graph, more specifically, an operation of generating a distribution graph of profile component evaluation values and positions of the focus lens 11.

A storage area for a record table 60 is secured in the RAM 42 of the controller 41 (or the DRAM 5) when the photographing power is turned on. The record table 60 is a table made of a focus lens position 61 and a focusing evaluation value 62 (whose initial value is 0). In the present embodiment, a profile component evaluation value is used as the focusing evaluation value 62. However, the present invention is not limited to this.

In FIG. 7, the CPU 41 searches for the record table 60, and updates the focusing evaluation value 62 corresponding to the focus lens position obtained in step S9 of FIG. 4, to the profile component evaluation value obtained in step S8 of FIG. 4 (step S10-1).

Next, the CPU 41 generates, with the use of the focus lens position 61 and the focusing evaluation value 62 (the profile component evaluation value in the present embodiment) stored in the record table 60, data representing an evaluation value distribution graph (see FIG. 2) which shows the focusing evaluation value by the height of a bar, in association with the focus lens position (step S10-2).

Further, at this time, in order for the bar corresponding to the current focus lens position to be conspicuous, the CPU 41 controls to use a different color for the bar from the color for the other bars (the bars corresponding to the past focus lens positions) (see reference numeral 123 in FIG. 2). That is, the CPU 41 controls to display the bar differently from the other bars (step S10-3).

By the operation shown in FIG. 7, it is possible to show, not mere a standard like the prior art, but a record of focusing degrees obtained as numerical values in correspondence with focus lens positions visually. Therefore, the user can know the focusing condition not subjectively but objectively, and can move the focus lens 11 to the in-focus position without fail. Further, since the current focusing condition is displayed differently, the user can easily compare the current focusing condition with the past focusing conditions, and can move the focus lens 11 to the in-focus position smoothly.

In step S10-3, for the sake of differential display, different colors are used for the bar in question and the other bars. However, this is not the only way of differential display. For example, differential display can be achieved by emphasizing, reversing, or blinking the bars. That is, in step S10-3, the display attribute of the bar in question may be set differently from that of the other bars. Further, instead of differential display of the bars, a cursor or the like may be displayed under the bar corresponding to the current focus lens position.

<Modification 1>

Figure 9:
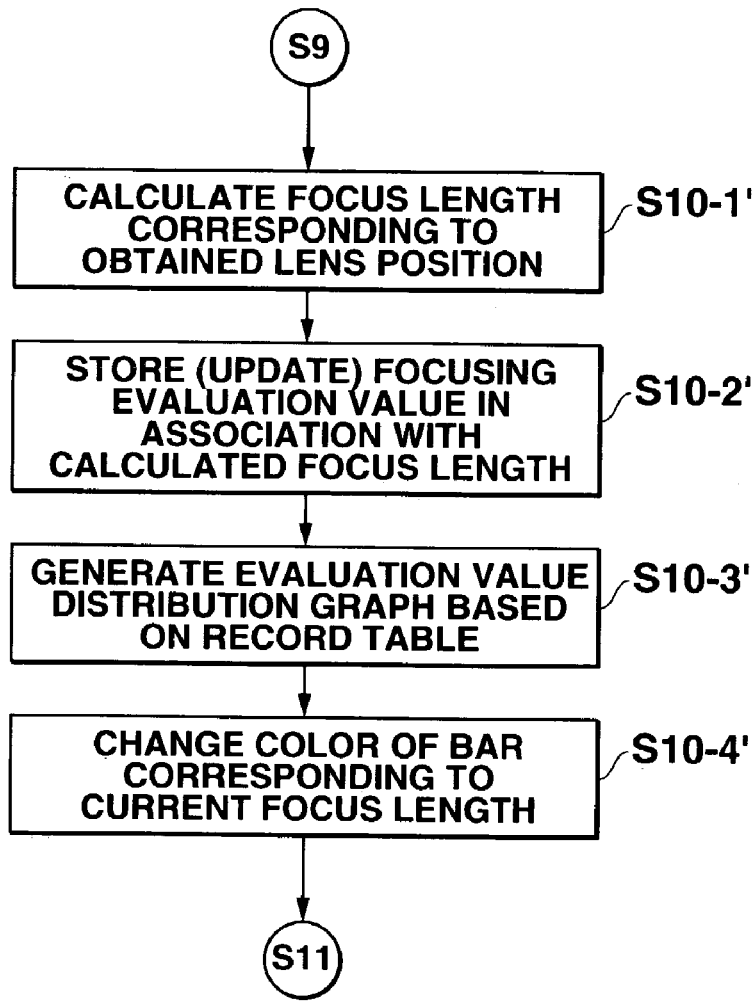
FIG. 9 is a flowchart showing a modified example of an operation for generating an evaluation value distribution graph.
Figure 10:
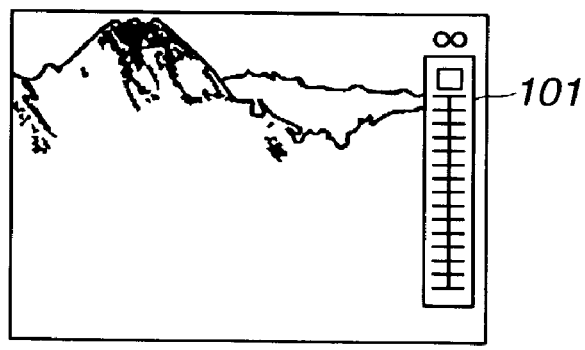
FIG. 10 is a diagram showing an example of a focusing standard to be displayed when focusing is performed according to a prior art.
Figure 11:
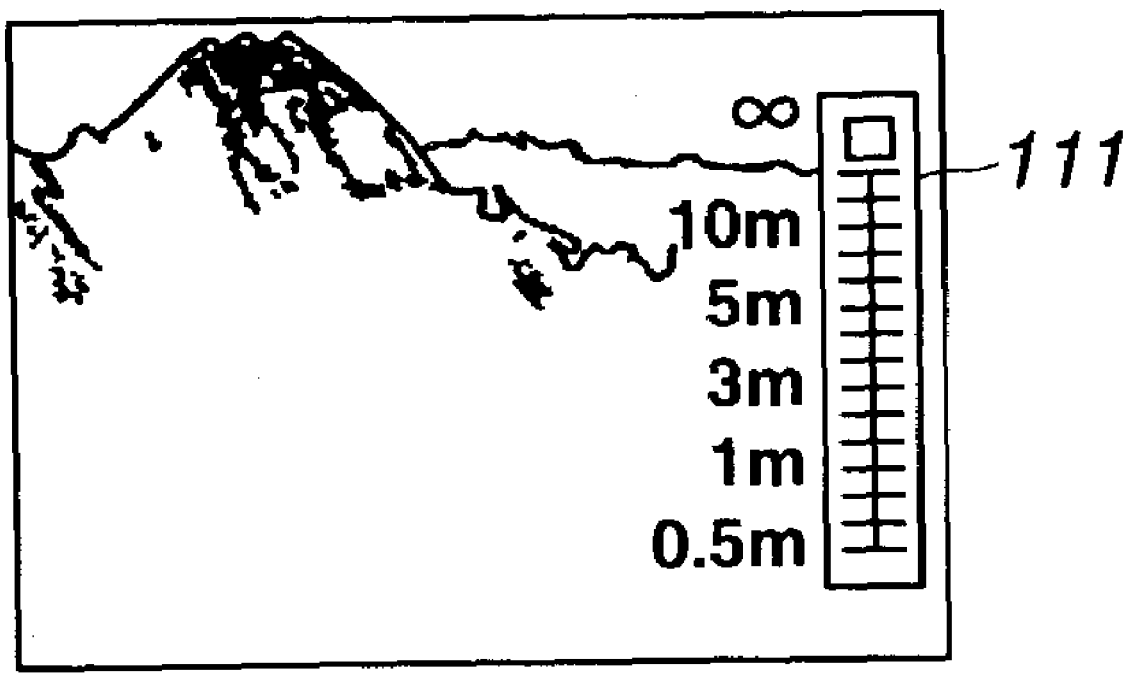
FIG. 11 is a diagram showing an example of a focusing standard to be displayed when focusing is performed according to a prior art.

FIG. 8 is a diagram showing one modification of the record table to be used when an evaluation value distribution graph is generated. FIG. 9 is a flowchart (a detailed flow of step S10 shown in FIG. 4) showing one modification of the operation of generating an evaluation value distribution graph, specifically, an operation of generating a distribution graph of profile component evaluation values of a photo-object and focus lengths.

When the photographing power is turned on, a storage area for a record table 70 is secured in the RAM 42 of the controller 4 (or the DRAM 5). The record table 70 is a table made of a focus length 71 and a focusing evaluation value 72 (whose initial value is 0). In this modification, a profile component evaluation value is used as the focusing evaluation value. However, the present invention is not limited to this.

In FIG. 9, the CPU 41 calculates a focus length corresponding to the focus lens position obtained in step S9 shown in FIG. 4 (step S10-1'). Then, the CPU 41 searches for the record table 70, and updates the focusing evaluation value 72 which is stored in the record table 70 and corresponds to the focus length obtained in step S10-1', to the profile component evaluation value obtained in step S8 shown in FIG. 4 (step S10-2').

Next, the CPU 41 generates, with the use of the focus length and focusing evaluation value stored in the record table 70, data representing an evaluation value distribution graph (see FIG. 3) which shows the focusing evaluation value by the height of a bar in association with the focus length (step S10-3').

At this time, in order for the bar corresponding to the current focus length to be conspicuous, the CPU 41 controls to use a different color for the bar from the color for the other bars (see reference numeral 133 shown in FIG. 3). That is, the CPU 41 controls to display the bar differently from the other bars (step S10-4').

By performing the operation shown in FIG. 9, unlike the distribution graph shown in FIG. 2, a distribution graph such as shown in FIG. 3 which shows luminance components of profiles of a photo-object and focus lengths corresponding to focus lens positions is displayed. Therefore, it is possible to visually display focusing degrees obtained as numerical values in association with focus lengths corresponding to focus lens positions, in a case where a clear distribution curve is not likely to appear such as a case of photographing an object which is low in illuminance and contrast. Accordingly, the user can know the focusing condition not subjectively but objectively, in a case where a clear distribution curve is not likely to appear such as a case where the user photographs an object which is low in illuminance and contrast. Further, since the current focusing condition is displayed differently, the user can get objective and appropriate focusing condition information.

In step S10-4', for the sake of differential display, different colors are used for the bar in question and the other bars. However, this is not the only way of differential display. For example, the bar in question may be emphasized, reversed, or blinked. Or, a pointer or a mark may be displayed under the graph.

<Modification 2>

The flowchart shown in FIG. 4 may include a step of detecting illuminance and contrast of a photo-object, and step S10 shown in FIG. 4 may include. a step of switching the flow to the operation shown in FIG. 7 or to the operation shown in FIG. 9 based on the detected values of the illuminance and contrast of the photo-object.

With this structure, the operation shown in the flowchart of FIG. 7 is performed and thus a distribution graph such as shown in FIG. 2 is displayed in a case where an object having normal illuminance and contrast is photographed, while the operation shown in the flowchart of FIG. 9 performed and a distribution graph such as shown in FIG. 3 is displayed in a case where an object having low illuminance and contrast is photographed. Therefore, the user know the focusing condition objectively and appropriately regardless of what the illuminance and contrast of a photo-object are like.

In the above described embodiment, when manual focusing is performed, a finder image on which a distribution graph showing focusing condition is superimposed, is displayed on the LCD for displaying the finder image. However, the photographing apparatus may be provided with a display monitor prepared specially for the distribution graph for showing the focusing condition, in order to display the focusing condition (there may not be an LCD for displaying the finder image). Further, a distribution graph for showing the focusing condition may be displayed on a part of an optical finder.

The embodiments of the present invention have been explained as above. However, it is needless to say that the present invention is not limited to the above described embodiments, but can be variously modified.

This application is based on Japanese Patent Application No. 2002-66603 filed on Mar. 12, 2002 and including specification, claims, drawings and summary. The disclosure of the above Japanese Patent Application is incorporated herein by reference in its entirety.

What is claimed is:

1. A photographing apparatus having a manual focusing function in which a photo-object is brought into focus through a manual operation performed by a user, the photographing apparatus comprising:

a manually operated focus button for instructing movement of a focus lens;

a focusing evaluation value obtaining unit which extracts contrast values of profiles of an image portion within a focus area of a photo-object image which is output from a photographing unit and obtains focusing evaluation values based on the extracted contrast values;

a lens position obtaining unit which obtains a focus lens position of the focus lens that is moved in accordance with operation of the focus button;

a distribution graph generation unit which generates, based on focusing evaluation values obtained successively by the focusing evaluation value obtaining unit and focus lens positions obtained successively by the lens position obtaining unit, a distribution graph of the focusing evaluation values in one to one correspondence with the focus lens positions, the distribution graph representing the focusing evaluation values by a plurality of bars;

an image display unit which acquires the photo-object image output from the photographing unit, and displays the acquired photo-object image as a finder image; and an image superimposition unit which superimposes the distribution graph generated by the distribution graph generation unit on the finder image displayed by the image display unit such that display of the plurality of bars of the generated distribution graph representing the focusing evaluation values enables a visual determination of the focus lengths corresponding to the plurality of focus lens positions, respectively, and distinguishing of a focusing evaluation value corresponding to a current focus lens position from the focusing evaluation values corresponding to other focus lens positions.

2. A focusing condition displaying method for a photographing apparatus having a manual focusing function in which a photo-object is brought into focus through a manual operation performed by a user, the focusing condition displaying method comprising:

obtaining a photo-object image by photographing;

extracting contrast values of profiles of an image portion, within a focus area, of the obtained photo-object image;

obtaining a focusing evaluation value based on the extracted contrast values;

obtaining a focus lens position of a focus lens that is moved in accordance with manual operation of a focus button for instructing movement of the focus lens;

generating, based on a plurality of obtained focusing evaluation values and a plurality of obtained focus lens positions, a distribution graph of the focusing evaluation values in one to one correspondence with the focus lens positions, the distribution graph representing focusing evaluation values by a plurality of bars;

displaying the photo-object image; and superimposing the distribution graph on the displayed photo-object image, so as to display the generated distribution graph such that display of the plurality of bars of the generated distribution graph representing focusing evaluation values enables a visual determination of the focus lengths corresponding to a plurality of focus lens positions and distinguishing of a focusing evaluation value corresponding to a current focus lens position from the focusing evaluation values corresponding to other focus lens positions.

3. A computer-readable storage medium having a focusing condition displaying program stored thereon that is executable by a computer to cause the computer to execute a process in a photographing apparatus having a manual focusing function in which a photo-object is brought into focus through a manual operation performed by a user, the process comprising:

extracting contrast values of profiles of an image portion, within a focus area, of a photo-object image from image data obtained by acquiring the photo-image;

obtaining a focusing evaluation value based on the extracted contrast values;

obtaining a focus lens position of a focus lens that is moved in accordance with manual operation of a focus button for instructing movement of the focus lens;

generating, based on a plurality of obtained focusing evaluation values and a plurality of obtained focus lens positions, distribution graph data of the focusing evaluation values in one to one correspondence with the focus lens positions, the distribution graph data representing focusing evaluation values as a plurality of bars;

displaying an image corresponding to the obtained image data; and superimposing the distribution graph, based on the generated distribution graph data, on the displayed image so as to display the distribution graph such that display of the plurality of bars of the generated distribution graph representing focusing evaluation values enables a visual determination of the focus lengths corresponding to a plurality of focus lens positions and distinguishing of a focusing evaluation value corresponding to a current focus lens position from the focusing evaluation values corresponding to other focus lens positions.

* * * * *